United States Patent [19]

Moncelle et al.

[11] Patent Number: 4,914,597
[45] Date of Patent: Apr. 3, 1990

[54] ENGINE CRUISE CONTROL WITH VARIABLE POWER LIMITS

[75] Inventors: Michael E. Moncelle, Normal; Robert T. Schaar, Chillicothe, both of Ill.; Edward E. Londt, Fort Wayne, Ind.

[73] Assignees: Caterpillar Inc., Peoria; Navistar International Corporation, Chicago, both of Ill.

[21] Appl. No.: 222,786

[22] Filed: Jul. 22, 1988

[51] Int. Cl.$^4$ .............................................. B60K 31/00
[52] U.S. Cl. ............................ 364/426.04; 364/424.1; 364/431.07; 123/352; 180/179; 74/866
[58] Field of Search ...................... 364/426.04, 431.07, 364/424.1, 442; 123/352, 357; 180/176–179; 74/866

[56] References Cited

U.S. PATENT DOCUMENTS

| | | | |
|---|---|---|---|
| 4,368,705 | 1/1983 | Stevenson et al. | 123/357 |
| 4,493,303 | 1/1985 | Thompson et al. | 123/352 |
| 4,498,016 | 2/1985 | Earleson et al. | 290/40 R |
| 4,506,752 | 3/1985 | Hara et al. | 180/179 |
| 4,559,599 | 12/1985 | Habu et al. | 364/442 |
| 4,698,762 | 10/1987 | Moriya et al. | 364/442 |
| 4,709,335 | 11/1987 | Okamoto | 364/431.05 |
| 4,736,813 | 4/1988 | Hayama et al. | 180/177 |

FOREIGN PATENT DOCUMENTS 3441070 11/1984 Fed. Rep. of Germany .
2141269A 5/1983 United Kingdom .

OTHER PUBLICATIONS

Patent Abstracts of Japan, vol. 9, No. 57, (M-363) (1780), Mar. 13, 1985, JP-A-59 192839, (Yanmar Diesel), Nov. 1, 1984.
Patent Abstracts of Japan, vol. 7, No. 9 (M-185) (1154), Jan. 14, 1983, JP-A-57 168038, (Nippon-Denso), Oct. 16, 1982.

Primary Examiner—Gary Chin
Attorney, Agent, or Firm—William E. McCracken

[57] ABSTRACT

A control for and method of operating a vehicle engine (12) equipped with a cruise control (44) includes apparatus for and the steps of providing a memory (86) having stored therein first and second sets of data which control the position of a fuel rack (20) as a function of engine speed, determining when the cruise control (44) is engaged, retrieving the first set of data from the memory (86) when the cruise control (44) is engaged, retrieving the second set of data from the memory (86) when the cruise control (44) is not engaged and using the retrieved set of data to control the rate of fuel delivery to the engine (12) whereby extra power is available when the cruise control (44) is engaged to minimize downshifting. Also, fuel economy is improved and the set cruise control speed is better maintained.

12 Claims, 4 Drawing Sheets

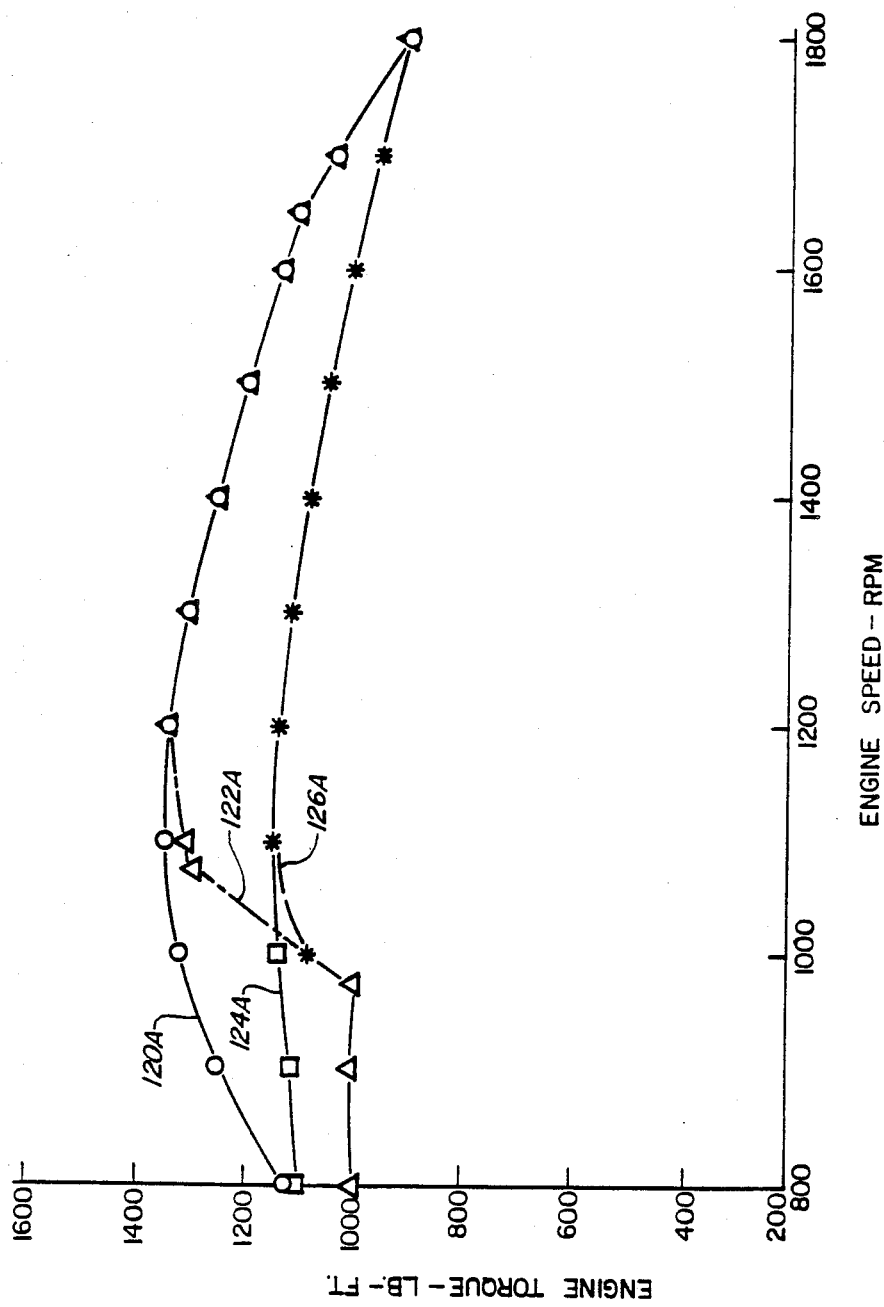

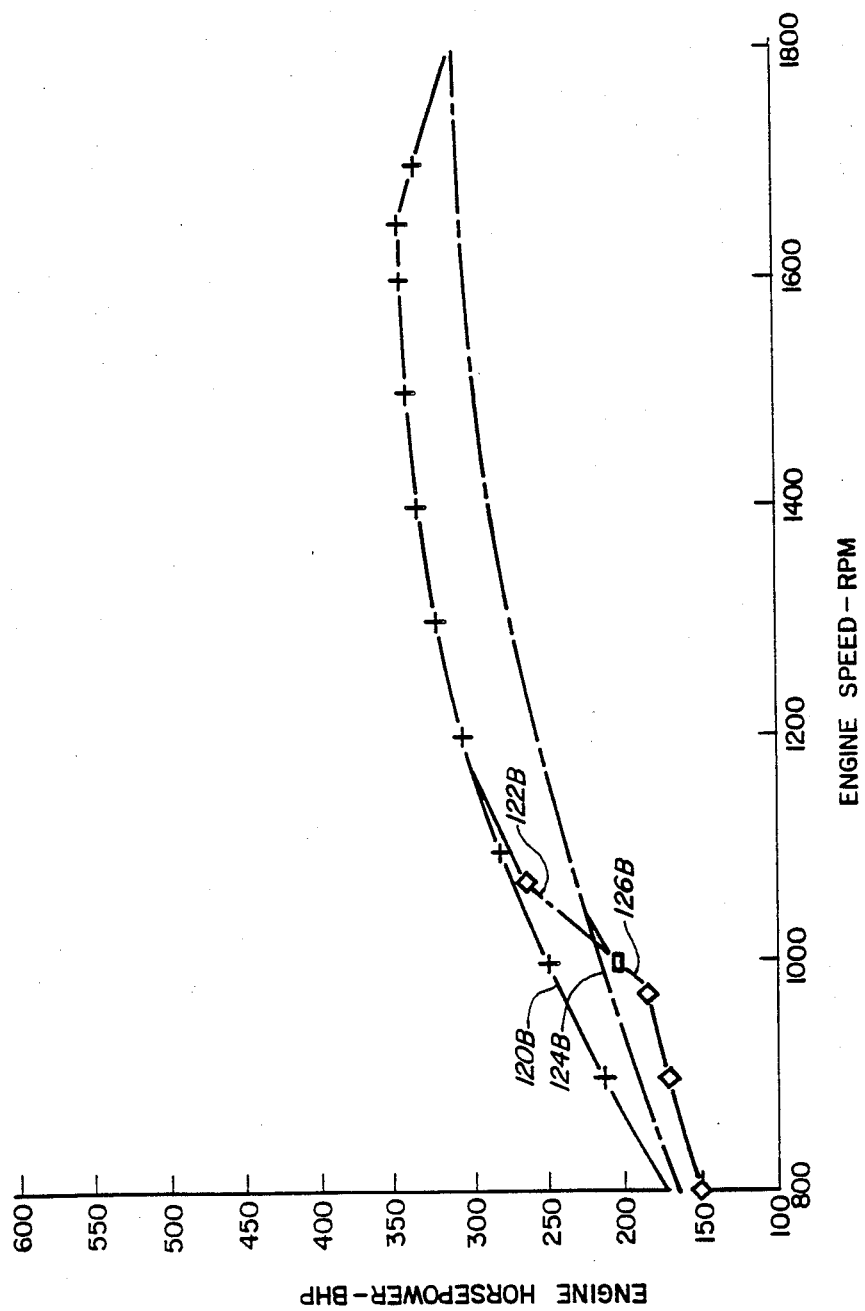

ENGINE CRUISE CONTROL WITH VARIABLE POWER LIMITS

TECHNICAL FIELD

The present invention relates generally to engine controls, and more particularly to a fuel control for an internal combustion engine which establishes fuel delivery limits in dependence upon whether a cruise control is engaged.

BACKGROUND ART

Typically, electronic engine controls for use in vehicles include a cruise control which allows an operator to select and maintain a desired vehicle speed under usual operating conditions without the necessity of operating the throttle control. Such cruise controls, however, are not capable of maintaining speed regulation when the engine is operating outside predetermined limits. For example, the actual vehicle speed may drop below or rise above a permissible range of vehicle speeds surrounding the selected speed when the vehicle is ascending or descending a hill, when changes in altitude render it impossible to maintain the vehicle speed, when wind or other external factors provide sufficient forces on the vehicle to oppose or aid the power developed by the engine, etc. In such a case, it is necessary for the operator to manually intervene if it is desired to maintain the speed of the vehicle within the permissible range. In the case of speeds below the permissible range, it is typically necessary for the operator to downshift in order to provide greater torque to the wheels s that the vehicle speed can be increased. This manual downshifting is objectionable and should be eliminated, if possible.

Prior art approaches to the problem of downshifting while operating in cruise control have involved the use of a semi-automatic transmission which automatically downshifts the transmission without leaving the cruise control mode when the vehicle speed reaches a predetermined limit below the desired or commanded speed. Such an approach reduces the number of manual transmission downshifts, but does not reduce the total number of gear shifts. Thus, the demands placed upon the transmission are not lessened.

The following patents disclose engine controls but do not address the problems noted above while operating in a cruise control mode.

Thompson et al., U.S. Pat. No. 4,493,303 discloses an engine control wherein data representing a plurality of separate power curves are stored in a memory and the data are used to control fuel rack limits. The engine is typically utilized with a transmission having different gear ranges. During operation of the engine, the particular gear range of the transmission is detected by sensing road speed and engine speed and the data representing a particular power curve are retrieved from the memory in dependence upon the detected gear range. The data are used to establish the rack limits during operation in such gear range in order to produce desired operating characteristics and fuel economy. This patent also discloses the use of a cruise control, although the problems noted above are not even recognized.

Stevenson et al., U.S. Pat. No. 4,368,705 discloses an engine control system in which a throttle controls the delivery of fuel by a fuel pump to the engine. The control system further includes a fuel pump rack limit circuit which controls the rate of fuel delivery to the engine in accordance with rack limits and a timing circuit which controls the timing of injection of fuel into the engine cylinders. The timing and rack limits are established in accordance with engine conditions to obtain maximum engine performance with smoke and emission levels limited to those required by the Environmental Protection Agency (EPA).

More particularly, a rack limit position map is stored in a memory and includes rack limit position values which are predetermined in accordance with the physical characteristics of the fuel pump. This map is coupled to a first input of a least wins logic selector circuit which is in turn coupled to a rack limit control loop. A second input of the least wins logic selector circuit is coupled to the output of a summing junction which in turn sums the output of a torque rise limit map and an altitude derating map stored in additional memories. The torque rise limit map develops rack limit position control signal values which are predetermined to allow more fuel to be injected in the engine cylinders at lower speeds to prevent engine lugging without exceeding EPA emissions standards. The altitude derating map develops rack limit position control signal values which are predetermined to meet EPA standards for different levels of ambient air pressure. These values decrease the fuel rack limits at higher altitudes to maintain an optimal fuel/air ratio.

The least wins logic selector circuit selects the lesser of the output from the rack limit position map and the summing junction and provides such lesser value to the rack position control loop. Thus, the rack limit is set by the lesser of the rack limit position map and the torque rise limit map as derated by the altitude derating map output.

The rack limit is used to control the maximum rack position of the fuel pump so that the rate of fuel delivery may not be increased by the throttle beyond the rack limit.

Earleson et al., U.S. Pat. No. 4,498,016 discloses a governor control for an engine in which a desired power setting is used to develop a speed error and the speed error is in turn used to determine a desired rack position for a rack actuator that controls the fuel delivery rate to the engine. The desired rack position is compared with the actual rack position to create a rack position error signal, which is in turn used by a rack position control loop to drive the rack position toward the desired position. If a power setting is issued for positive acceleration, it is possible that the commanded acceleration of the engine will require more rack than is called for from the rack position actuator, thereby producing a negative rack error while a power increase is commanded. The resulting "dip" is eliminated by temporarily adding an acceleration signal to the position error signal to compensate for the lag in the desired rack position signal.

The present invention is directed to overcoming one or more of the problems set forth above.

DISCLOSURE OF THE INVENTION

In accordance with the present invention, a control for and method of operating a vehicle engine equipped with a cruise control which is engageable to maintain the speed of the vehicle at a desired speed includes means for and the steps of providing a memory having stored therein first and second sets of data representing first and second different fuel delivery limit curves representing different fuel delivery limits as a function of engine speed and means for and the step of retrieving at least a portion of the first set of data from the memory when the cruise control is engaged and for retrieving at least a portion of the second set of data from the memory when the cruise control is not engaged. The retrieved set of data is then used to develop a command signal for a rack delivery control to in turn control the rate of fuel delivery to the engine.

In the preferred embodiment, the fuel control is of the mechanical rack type and the fuel delivery limit curves comprise rack limit curves for the control. The first rack limit curve establishes rack limits as a function of engine speed greater than the rack limits established by the second set of data as a function of engine speed over a majority of the speed range. Thus, when the cruise control is engaged, a higher engine output power is available, if needed, so that an operator is less likely to have to downshift in order to provide the torque required to maintain the actual vehicle speed at the desired vehicle speed.

In addition to the foregoing operation, third and fourth sets of data representing third and fourth rack limit curves, respectively, are stored in the memory. The control determines whether a transmission driven by the engine is operating in a particular gear range, and, if so, at least a portion of the third set of data is retrieved from the memory when the cruise control is engaged or at least a portion of the fourth set of data is retrieved from the memory when the cruise control is not engaged.

The data retrieved from the memory are compared against rack limit data developed by a governor control loop in accordance with the commanded speed of the engine wherein the rack limit data represents a governor rack limit curve. The data representing the lesser of the retrieved rack limit curve and the governor rack limit curve are passed to the rack position control to in turn control the rate of fuel delivery to the engine.

In the preferred embodiment, the first and third rack limit curves and the second and fourth rack limit curves are identical within a particular engine speed range and the third rack limit curve is less than the first rack limit curve and the fourth rack limit curve is less than the second rack limit curve in the remainder of the speed range. The control is thus operable to limit engine output power within a particular engine speed range, if necessary or desirable.

BRIEF DESCRIPTION OF THE DRAWINGS

FIGS. 2A and 2B comprise a series of torque and horsepower curves as a function of engine speed, respectively, representing engine operation for each of four rack limit curves stored as data in the rated rack limit block of FIG. 1.

DESCRIPTION OF THE PREFERRED EMBODIMENT

Figure 1:
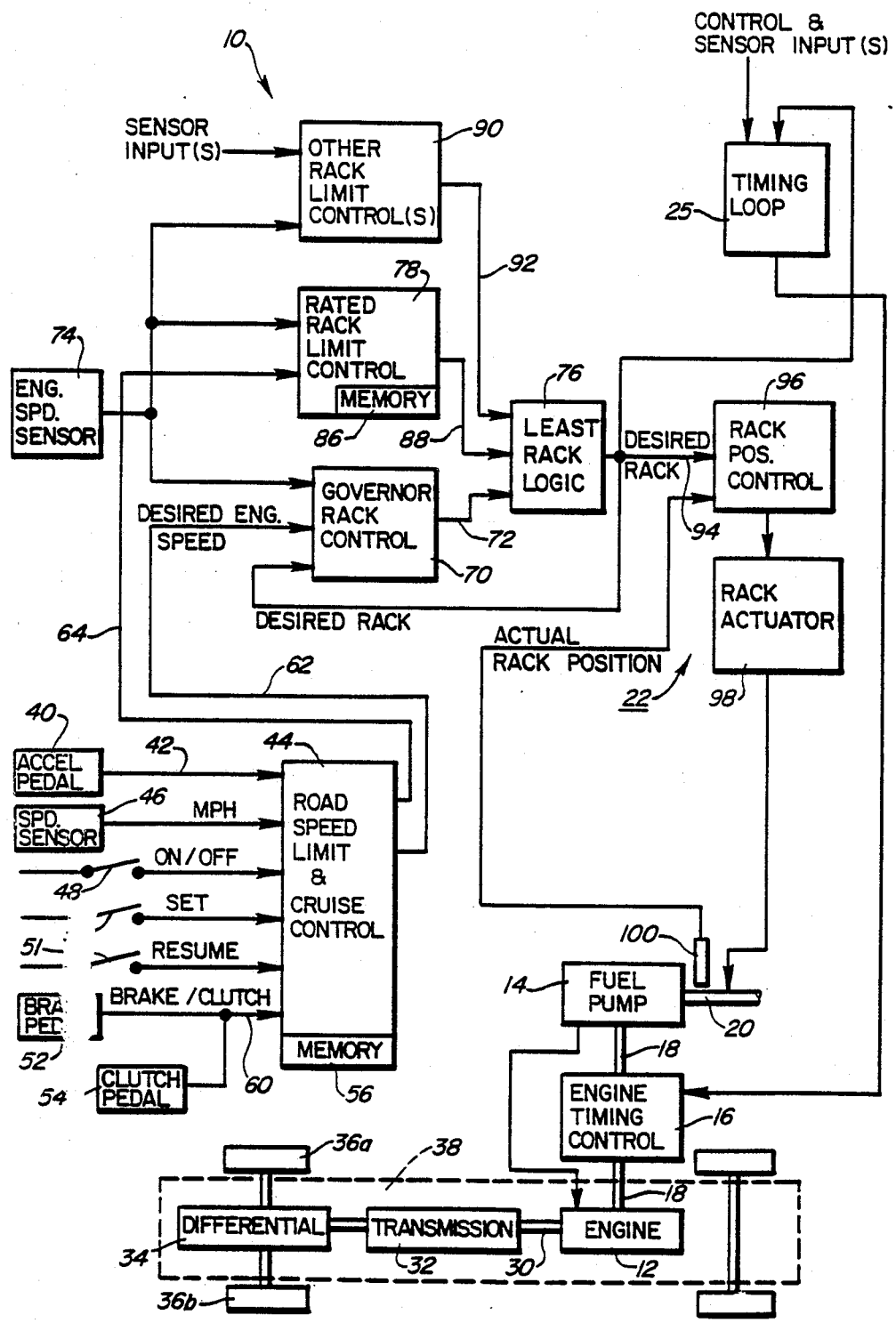
FIG. 1 is a block diagram of an engine and drive train of a vehicle in conjunction with an engine control according to the present invention.

Referring now to FIG. 1, there is illustrated an engine control 10 which controls an engine 12 via a fuel delivery system in the form of a fuel pump 14 and an engine timing control 16. The fuel pump 14 and engine timing control 16 are coupled to the engine 12 by a timing shaft 8. The fuel pump 14 includes a fuel rack 20 which is positionable within a range of rack positions by a rack position control loop, illustrated generally at 22. The rack position control loop develops a position command signal described hereinafter which controls the rate of fuel delivery by the fuel pump 14 to the engine 12.

The engine timing control 16 is responsive to a timing control loop 2 to in turn control the timing of fuel injection by the fuel pump 14 relative to top dead center of each piston of the engine 12.

The engine 12 is coupled by a drive shaft 30 to a transmission 32 which is operable in a plurality of gear ratios or ranges. The transmission 32 is in turn coupled through a differential 34 to one or both of a pair of wheels 36a, 36b of a vehicle, shown generally at 38. Of course, the vehicle may alternatively include tandem axles and/or dual wheels, if desired.

The speed of the vehicle 38 may be varied by an accelerator or throttle pedal 40 which is controlled by an operator of the vehicle 38. The accelerator or throttle pedal 40 develops a signal on a line 42 which is coupled to a road speed limit and cruise control 44. The control 44 also receives inputs from a speed sensor 46 which detects the ground speed in miles per hour of the vehicle 38 as well as inputs from three switches 48, 50 and 51, a brake pedal 52 and a clutch pedal 54. When the switch 48 is closed, a signal is passed to the road speed limit and cruise control 44 to engage the cruise control mode of operation. When the switch 50 is momentarily closed, the current speed of the vehicle as detected by the speed sensor 46 is stored in a memory 56 within the control 44. This speed comprises a speed command or set speed when operating in the cruise control mode. If this switch 50 is closed for longer than a predetermined time, for example one second, the set speed is increased with time until the switch 50 is closed. The switch 51, when momentarily closed, commands the control 44 to resume cruise control operation at the set speed which is stored in the memory 56 of the control 44. If the switch 51 is closed for longer than the predetermined time, the set speed is decreased with time until this switch is opened.

When either the brake pedal 52 or clutch pedal 54 is depressed, a signal is coupled over a line 60 to the control 44 to disengage the cruise control mode of operation.

The cruise control 44 develops a first output on a line 62 representing the desired speed in rpm of the engine 12. The control 44 also develops signals on lines 64 representing whether the cruise control is engaged and, if so, the set speed for the vehicle 38 as stored in the memory 56 of the control 44.

The line 62 is coupled to a governor rack control 70 which provides data as a signal on a line 72 represented by a governor rack control curve. This curve defines a series of governor rack positions or settings as a function of actual engine speed as detected by an engine speed sensor 74 and desired engine speed as indicated by the signal on the line 62. The signal on the line 72 developed by the control 70 is coupled to a first input of a least rack logic circuit 76.

The signals on the lines 64 developed by the control 44 are coupled to one input of a rated rack limit control 78 which also receives an input from the engine speed sensor 74. The rated rack limit control 78 includes a memory in the form an EPROM 86 which stores a plurality of sets of data each representing a fuel delivery limit curve as a function of engine speed. In the preferred embodiment, the fuel delivery system is of the rack type, and thus the sets of data represent a plurality of rated rack limit control curves defining rated rack limit positions or settings as a function of engine speed. The rack limit control selects one of the sets of data from the memory 86 based upon a control algorithm described in connection with FIG. 3 hereinafter, uses the data to develop a signal which varies with engine speed and provides such signal to a second input of the least rack logic circuit 76 over a line 88.

Each set of data includes a predetermined number of digital data values each representing a rack limit at a particular engine speed. The rack limits for engine speeds not stored in the memory 86 are obtained by determining the closest engine speeds below and above the current engine speed for which rack limits are stored and linearly interpolating between these two rack limits.

Further rack limit data may be provided as a signal on a line 92 to a third input of the least rack logic circuit 76. The data provided on the line 92 may be provided by one or more other rack limit controls 90 which may be responsive to sensor inputs.

The magnitude of the signal provided on the line 72 by the governor rack control 70 varies with engine speed and such magnitude is continuously compared against the speed-variable magnitude of the signals provided by the controls 78 and 90 on the lines 88 and 92, respectively. The signal having the least magnitude is passed over a line 94 to a rack position control 96 which is coupled to a rack actuator 98. The rack actuator 98 in turn controls the position of the rack 20 in response to a rack position command signal developed by the rack position control 96. The actual rack position is sensed by a position sensor 100 and is passed as a signal back to the rack position control 96.

Referring now to FIGS. 2A and 2B, there are shown torque and horsepower curves which illustrate the operation of the engine under the assumption that the signal on the line 88 from the rated rack limit control 78 is passed by the least rack circuit 76 to the rack position control 96. The curve 120A represents the engine torque and the curve 120B represents the engine horsepower as a function of engine speed when the cruise control is engaged and the transmission 32 is in any gear range except a particular gear or gears, such as the highest gear. If the cruise control is engaged and the transmission 32 is in the particular, i.e. highest gear, a second set of data is retrieved from the memory 86 representing a different rated rack limit curve, in turn resulting in the torque curve 122A and horsepower curve 122B, respectively. These curves differ from the curves 120A, 120B in that engine torque and horsepower are limited below a particular engine speed range, approximately 1,200 rpm, to reduce the amplitude response of the drive train comprising the transmission 32 and the differential 34 within such speed range.

If the cruise control is not engaged, different sets of data are selected from the memory 86 in dependence upon whether the transmission 32 is operating in the particular gear or gears, or a gear other than the particular gear or gears. If the transmission is operating in other than the highest gear, the set of data retrieved from the memory 86 results in engine operation as depicted by the torque curve 124A and horsepower curve 124B. A fourth set of data is retrieved from the memory 86 when the cruise control is not engaged and the transmission 32 is operating in the highest gear range. This set of data results in operation of the engine as represented by the torque curve 126A and the horsepower curve 126B.

It can be seen that, when the cruise control is engaged, a higher engine power output is permitted, thereby allowing greater torque to be made available to the operator so that the need for downshifting is lessened.

Figure 3:
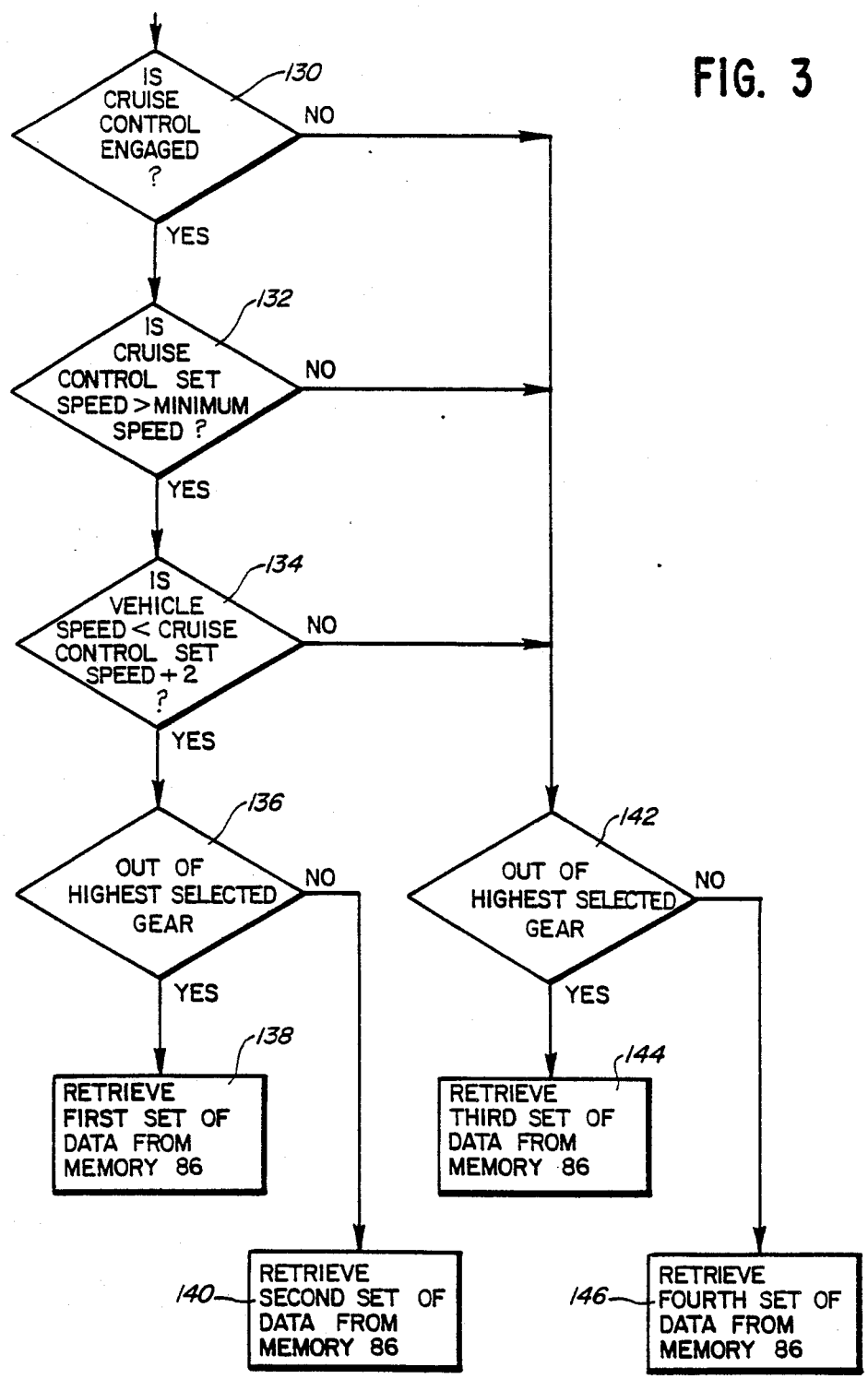
FIG. 3 comprises a flowchart of programming executed by the road speed limit and cruise control block and/or the rated rack limit block of FIG. 1 to effect the control and method of the present invention.

Referring now to FIG. 3, there is illustrated programming executed by the rated rack limit control 78 for retrieving the sets of data provided as signals on the line 88 to the least rack logic circuit 76. The programming shown in FIG. 3 may alternatively be executed by the road speed limit and cruise control 44, if desired, in which case the memory 86 may be located in the control 44.

The program begins at a series of blocks 130, 132, 134 and 136 which check various operating parameters to determine which of the first through fourth sets of data is to be retrieved from the memory 86. In summary, higher rated rack limits, and thus higher engine output torque and horsepower levels, are made available when: (1) the cruise control is engaged; (2) the cruise control set speed is greater than a minimum predetermined speed; and (3) the vehicle speed is less than the cruise control set speed plus a predetermined value. In addition, all of the rack limits are derated in a certain engine speed range when the transmission 32 is operating in the particular gear or gears.

More particularly, the block 130 checks to determine whether the cruise control has been engaged. If this is the case, the block 132 checks the signal on the line 64 to determine whether the commanded ground speed of the vehicle 38 as indicated on the line 64 is greater than the minimum speed which may be, for example, 30 m.p.h. If so, control passes to the block 134 which checks to determine whether the vehicle speed as detected by the speed sensor 46 is less than the cruise control set speed as stored in the memory 56 plus a predetermined range value which, in the preferred embodiment, is equal to two miles per hour. If this is also the case, control passes to the block 136 which checks to determine whether the transmission is operating in other than the predetermined, i.e. highest gear. If the transmission 32 is not operating in the highest gear, the first set of data represented by the torque and horsepower curves 120A, 120B of FIG. 2 is retrieved from the memory 86 and delivered as a signal over the line 88 to the least rack logic circuit 76. On the other hand, if the transmission 32 is operating in the highest gear, the second set of data resulting in engine operation represented by the curves 122A, 122B is selected from the memory 86 and passed as a signal over the line 88. As previously noted, this set of data results in derated engine output torque and horsepower below a certain speed, such as 1200 rpm, as compared with the engine output in this speed range resulting from selection of the first set of data.

If any of the questions posed by the blocks 130, 132 or 134 is answered in the negative, then it has been determined that the increased rack limits represented by the torque curves 120A, 122A and respective horsepower curves 120B and 122B are not to be used. A block 142 thus determines whether the transmission is out of the highest gear, and if so, the third set of data resulting in engine operation represented by the curves 124A, 124B is retrieved from the memory 86 and passed as a signal to the least rack logic circuit 76 by a block 144. Otherwise, a block 146 retrieves the fourth set of data resulting in engine operation represented by the curves 126A, 126B from the memory 86 and passes such data as a signal to the least rack logic circuit 76. This set of data, like the second set of data described above, results in derated engine operation below a certain engine speed.

It can be seen that the control of the present invention permits an operator to command higher rack limits when operating with the cruise control engaged so that the need for downshifting is reduced. This results in improved maintenance of the commanded vehicle speed in the cruise control mode. Also, the control allows even non-expert drivers to achieve the fuel economy obtained by expert drivers, and hence fuel expense is reduced as compared with an engine having equivalent performance characteristics.

It should be noted that a different number of sets of data and/or different data values may be stored in the memory 86 so that engine output power may be tailored to other operating factors or conditions.

We claim:

1. A method of operating a vehicle engine (12) equipped with a cruise control (44) which is engageable to control the speed of the vehicle (38) in response to a set speed wherein the engine includes a fuel delivery system (14) which is responsive to a command signal to in turn control the rate of fuel delivery to the engine, comprising the steps of:
   providing a memory (86) having stored therein two sets of data representing two different fuel delivery limit curves wherein each fuel delivery limit curve defines predetermined fuel delivery limits as a function of engine speed;
   determining when the cruise control (44) is engaged;
   retrieving one of the sets data from the memory (86) representing one of the fuel deliver limit curves when the cruise control (44) is engaged;
   retrieving the other set of data from the memory (86) representing the other fuel delivery limit curve when the cruise control (44) is not engaged; and
   using the retrieved data to develop the command signal.

2. The method of claim 1, including the further steps of determining whether the set speed is greater than a predetermined speed and retrieving at least a portion of the other set of data from the memory (86) when the set speed is determined to be not greater than the predetermined speed.

3. The method of claim 1, including the further steps of determining whether the speed of the vehicle is less than the set speed plus a predetermined value and retrieving at least a portion of the other set of data from the memory (86) when the vehicle speed is not less than the set speed plus the predetermined value.

4. The method of claim 1, wherein the engine (12) is operable within a speed range and wherein the fuel delivery limits established by the one set of data are greater than the fuel delivery limits established by the other set of data as a function of engine speed over a majority of the speed range.

5. The method of claim 1, wherein the engine (12) is coupled to a transmission (32) operable in a plurality of gear ranges and including the further steps of storing an additional two sets of data in the memory (86) representing two additional fuel delivery limit curves, determining whether the transmission (32) is operating in a particular gear range, retrieving one of the additional sets of data from the memory (86) when the cruise control (44) is engaged and the transmission (32) is operating in the particular gear range and retrieving the other of the additional sets of data from the memory (86) when the cruise control (44) is not engaged and the transmission (32) is operating in the particular gear range.

6. The method of claim 1, wherein the speed of the engine (12) is controlled in accordance with a desired engine speed and wherein the step of using includes the further step of comparing the retrieved data against control data developed by a governor control (70) in accordance with the desired engine speed to determined the lesser of the two and passing the lesser data to the fuel delivery system.

7. A control (10) for operating a vehicle engine (12) coupled to a transmission (32) operable in a plurality of gear ranges wherein the engine is equipped with a cruise control (44) which is engageable to maintain the speed of the vehicle (38) at a desired speed and wherein the engine includes a fuel rack (20) which is positionable within a range of rack positions by a rack position control loop (22) which develops a position command signal to in turn control the rate of fuel delivery to the engine, comprising:
   a memory (86) having stored therein four sets of data representing four different rack limit curves wherein each rack limit curve defines predetermined fuel rack position limits as a function of engine speed;
   means (130) for determining when the cruise control is engaged;
   means (136, 142) for determining whether the transmission is operating in a predetermined gear range;
   means (138) for retrieving a first set of data from the memory representing one of the rack limit curves when the cruise control is engaged and the transmission is not operating in the predetermined gear range;
   means (140) for retrieving a second set of data from the memory representing a second rack limit curve when the cruise control is engaged and the transmission is operating in the predetermined gear range;
   means (144) for retrieving a third set of data from the memory representing a third rack limit curve when the cruise control is not engaged and the transmission is not operating in the predetermined gear range;
   means (146) for retrieving a fourth set of data from the memory representing a fourth rack limit curve when the cruise control is not engaged and the transmission is operating in the predetermined gear range; and
   means (96) for developing the rack position command signal in response to the retrieved set of data whereby the first and second sets of data represent rack limit curves greater than the rack limit curves represented by the third and fourth sets of data.

8. The control of claim 7, wherein the engine is operable over a speed range and wherein the rack limit curves represented by the first and third sets of data are greater than the rack limit curves represented by the second and fourth sets of data, respectively, over the entire engine speed range.

9. The control of claim 7, wherein the speed of the engine is controlled in accordance with a desired engine speed and further including a governor rack control (70) which develops rack control data in accordance with the desired engine speed and a least wins logic circuit (76) coupled to the governor rack control (70) and the memory (86) for comparing the set of data retrieved from the memory against the rack control data developed by the governor rack control and passing the lesser data to the rack position command signal developing means (96).

10. A control (70) for operating a vehicle engine (12) coupled to a transmission (32) operable in a plurality of gear ranges wherein the engine is equipped with a cruise control (44) which is engageable to control the speed of the vehicle (38) in response to a set speed and wherein the engine includes a fuel rack (20) which is positionable within a range of rack positions by a rack position control loop (22) which develops a position command signal to in turn control the rate of fuel delivery to the engine, comprising:

a memory (86) having stored therein four sets of data representing four different rack limit curves wherein each rack limit curve defines predetermined fuel rack position limits as a function of engine speed;

first means (130) for determining when the cruise control is engaged;

second means (136, 142) for determining whether the transmission is operating in a predetermined gear range;

third means (132) for determining whether the set speed is greater than a predetermined minimum speed;

fourth means (134) for determining whether the speed of the vehicle is less than the set speed plus a predetermined value;

first means (138) coupled to the first through fourth determining means for retrieving a first set of data from the memory representing one of the rack limit curves when the cruise control is engaged, the transmission is not operating in the predetermined gear range, the set speed is greater than the predetermined speed and the speed of the vehicle is less than the set speed plus a predetermined value;

second means (140) coupled to the first through fourth determining means for retrieving a second set of data from the memory representing a second rack limit curve when the cruise control is engaged, the transmission is operating in the predetermined gear range, the set speed is greater than the predetermined speed and the speed of the vehicle is less than the set speed plus the predetermined value;

third means (144) coupled to the first through fourth determining means for retrieving a third set of data from the memory representing a third rack limit curve when the cruise control is not engaged or the set speed is not greater than the predetermined speed or the speed of the vehicle is not less than the set speed plus the predetermined value and the transmission is not operating in the predetermined gear range;

means (146) for retrieving a fourth set of data from the memory representing a fourth rack limit curve when the cruise control is not engaged or the set speed is not greater than the predetermined speed or the speed of the vehicle is not less than the set speed plus the predetermined value and the transmission is operating in the predetermined gear range; and means (96) for developing the rack position command signal in response to the retrieved set of data whereby the first and second sets of data represent rack limit curves greater than the rack limit curves represented by the third and fourth sets of data.

11. The control of claim 10, wherein the engine is operable over a speed range and wherein the rack limit curves represented by the first and third sets of data are greater than the rack limit curves represented by the second and fourth sets of data, respectively, over the entire engine speed range.

12. The control of claim 10, wherein the speed of the engine is controlled in accordance with a desired engine speed and further including a governor rack control (70) which develops rack control data in accordance with the desired engine speed and a least wins logic circuit (76) coupled to the governor rack control (70) and the memory (86) for comparing the set of data retrieved from the memory against the rack control data developed by the governor rack control and passing the lesser data to the rack position control loop (22).

* * * * *